(12) United States Patent
Lonkar (10) Patent No.: US 12,520,227 B2
(45) Date of Patent: Jan. 6, 2026

(54) SYSTEMS AND METHODS FOR REDUCING WIRELESS NETWORK CONGESTION

(71) Applicant: T-Mobile USA, Inc., Bellevue, WA (US)

(72) Inventor: Shon Lonkar, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 140 days.

(21) Appl. No.: 18/200,863

(22) Filed: May 23, 2023

(65) Prior Publication Data

US 2023/0300718 A1    Sep. 21, 2023

Related U.S. Application Data (63) Continuation of application No. 17/346,879, filed on Jun. 14, 2021, now Pat. No. 11,689,987, which is a continuation of application No. 16/684,043, filed on Nov. 14, 2019, now Pat. No. 11,071,042.

(51) Int. Cl.
| | |
|---|---|
| *H04W 48/02* | (2009.01) |
| *H04M 15/00* | (2024.01) |
| *H04W 8/18* | (2009.01) |

(52) U.S. Cl.
CPC ........... *H04W 48/02* (2013.01); *H04M 15/88* (2013.01); *H04W 8/18* (2013.01)

(58) Field of Classification Search
CPC ........ H04W 48/02; H04W 8/18; H04M 15/88
See application file for complete search history.

(56) References Cited

U.S. PATENT DOCUMENTS

| | | | |
|---|---|---|---|
| 9,179,007 B1 | 11/2015 | Yadav | |
| 9,742,916 B1* | 8/2017 | Christopher | ........ H04M 3/5158 |
| 10,510,089 B2* | 12/2019 | Zhang | ..................... G06Q 50/40 |
| 10,568,018 B1* | 2/2020 | Sharma | ................. H04L 67/535 |
| 11,071,042 B2 | 7/2021 | Lonkar | |
| 11,689,987 B2 | 6/2023 | Lonkar | |
| 2012/0275401 A1* | 11/2012 | Sun | ....................... H04W 72/23 |
| | | | 370/329 |

(Continued)

OTHER PUBLICATIONS

Notice of Allowance dated Mar. 18, 2021 for U.S. Appl. No. 16/684,043 (pp. 1-7).

(Continued)

*Primary Examiner* — Muthuswamy G Manoharan
(74) *Attorney, Agent, or Firm* — Lee & Hayes, P.C.

(57) ABSTRACT

A method for reducing wireless network congestion including receiving, at a network node, an initial request for network access from a mobile device from an initial location of the mobile device. In response to receiving the initial request for network access, the method includes determining whether a data allocation for the mobile device has been exceeded and denying, by the network node, the initial request for network access when the data allocation for the mobile device has been exceeded. The method includes receiving, at the network node, a subsequent request for network access from the mobile device from a subsequent location of the mobile device. The method includes denying, by the network node, the subsequent request for network access when the subsequent location is in the same geographic region as the initial location and a request time of the subsequent request is outside a customer support time period.

20 Claims, 6 Drawing Sheets

(56) References Cited

U.S. PATENT DOCUMENTS

| | | | |
|---|---|---|---|
| 2013/0078947 A1* | 3/2013 | Pecen | H04L 63/1458 |
| | | | 455/411 |
| 2014/0198637 A1* | 7/2014 | Shan | H04W 52/244 |
| | | | 370/229 |
| 2014/0226489 A1 | 8/2014 | Cha | |
| 2015/0138964 A1* | 5/2015 | Cha | H04W 48/06 |
| | | | 370/230 |
| 2019/0036880 A1 | 1/2019 | Dasar | |
| 2021/0153101 A1 | 5/2021 | Lonkar | |
| 2021/0306933 A1 | 9/2021 | Lonkar | |

OTHER PUBLICATIONS

Office Action (Non-Final Rejection) dated Sep. 12, 2022 for U.S. Appl. No. 17/346,879 (pp. 1-10).
Office Action (Notice of Allowance and Fees Due (PTOL-85)) dated Feb. 15, 2023 for U.S. Appl. No. 17/346,879 (pp. 1-7).
Office Action dated Dec. 7, 2020 for U.S. Appl. No. 16/684,043 (pp. 1-15).
Office Action dated Jun. 9, 2020 for U.S. Appl. No. 16/684,043 (pp. 1-12).

* cited by examiner

SYSTEMS AND METHODS FOR REDUCING WIRELESS NETWORK CONGESTION

CROSS-REFERENCE TO RELATED APPLICATIONS

This application is a continuation of U.S. application Ser. No. 17/346,879, filed Jun. 14, 2021, which is a continuation of U.S. application Ser. No. 16/684,043, filed Nov. 14, 2019, now U.S. Pat. No. 11,071,042, the disclosures of which are incorporated by reference herein in their entirety.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

A network provider, such as a cellular communications or data provider, may provide options to pay for unlimited or limited amounts of data that may be accessed by a user's mobile device over a cellular network during a given time period, e.g., per month, per week, a specific number of days, etc. Often, the amount of data may be limited by location as well. Once the data allotment of data has been used, the mobile device may no longer have access to data over the network. Nevertheless, network assets (e.g., nodes, servers, base stations, gateways, etc.) may still need to be used to determine that any particular user's mobile device should not have access to data.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an embodiment, the disclosure describes a computer-implemented method for reducing wireless network congestion. The method may comprise receiving an initial request for network access from a mobile device via a radio access network (RAN), where the initial request for network access including a request to access data through a wireless network and the mobile device being associated with a user. The method may include, in response to receiving the initial request for network access, transmitting a request to a policy and charging rules function (PCRF). The method may include receiving, from the PCRF, a rejection message denying access to data through the wireless network, and denying the initial request for network access based on the rejection message. The method may include, in response to receiving the rejection message, storing, in a memory, information identifying the mobile device and the user associated with the initial request for network access. The method may include receiving a subsequent request for network access from the mobile device via the RAN, and scanning the memory to determine that identifying information associated with the subsequent request for network access matches the stored information associated with the initial request for network access. Based on the matching stored information associated with the initial and subsequent requests for network access, the method may include denying the subsequent request for network access.

In another embodiment, the disclosure describes a computer-implemented method for reducing wireless network congestion. The method may comprise receiving an initial request for access to a wireless network via a radio access network (RAN), where the initial request including a mobile station integrated services digital network (MSISDN) and an access point name (APN) associated with a mobile device initiating the initial request. The method may include, in response to receiving the initial request for access, transmitting a request to a wireless network node and receiving, from the wireless network node, a rejection response denying access to data through the wireless network. The method may include denying the initial request based on the rejection response and, in response to receiving the rejection response, storing, in a memory, the MSISDN and the APN associated with the mobile device. The method may include receiving a subsequent request for access to the wireless network via the RAN, where the subsequent request including a MSISDN and an APN. The method may include scanning the memory to determine that the MSISDN and the APN associated with the subsequent request matches the stored MSISDN and the stored APN associated with the initial request for access. The method may include, based on the determination that the stored MSISDN and APN associated with the initial request for access matches the MSISDN and the APN associated with the subsequent request for access to the wireless network, denying the subsequent request for access to the wireless network.

In another embodiment, the disclosure describes a system for reducing wireless network congestion. The system may comprise a first network node configured to receive, from a mobile device via a radio access network (RAN), an initial request to access a wireless network and, based on the initial request, transmit a wireless session request including a mobile station integrated services digital network (MSISDN) and an access point name (APN) associated with the mobile device. The system may include a second network node configured to receive the wireless session request from the first network node and, based on receiving the wireless session request, transmit a credit control request. The method may include a third network node configured to receive the credit control request (CCR) from the second network node and, in response to receiving the CCR, transmit a request for user data status for a user associated with the mobile device. The method may include a fourth network node configured to receive the request for user data status and, in response to receiving the request for user data status, transmit a user data status response indicating that the user has exceeded a data allocation for the mobile device. In response to receiving the user data status from the fourth network node indicating that the user has exceeded the data allocation, the third network node may be further configured to transmit an authorization rejected message to the second network node. In response to receiving the authorization rejected message from the third node, the second network node may be further configured to store, in a memory, the MSISDN and the APN associated with the mobile device. Upon receiving a subsequent request to access the wireless network from the mobile device via the RAN, the second network node may be configured to deny the mobile device access to data via the wireless network.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Network providers, such as entities providing cellular phone and data service, may use various hardware, software, or other tools and systems to provide systems and methods to reduce network congestion. In some embodiments or applications, some network providers may offer subscribers or other users options to purchase or otherwise obtain access to limited data over the cellular network, such as 10 GB, 20 GB, etc. One non-limiting example may be if a subscriber would like to travel abroad to another country where the subscriber's regular data plan may not be covered. In such scenarios, a subscriber or other customer may opt to purchase a data roaming package for a limited amount of data for a prescribed time period that may be used while abroad. Once the data allotment has been met (e.g., 10 GB), the subscriber's mobile device may no longer access data over the network. In order to determine that that subscriber's mobile device no longer has data access, however, various resources in the cellular network must be utilized only to determine that the mobile device no longer has data access.

In some embodiments, the any data or relative user service access may include Radio Access Network (RAN) checks with packet core network for resource allocation, authentication, and authorization before granting service. Often, if a user has depleted its data or service balance, subsequent attempts to access data may be rejected by a network resource, such as the policy and charging rule functions (PCRF) or online charging system (OCS) on routine flow checks from other network resources such as a serving gateway and packet gateway/gateway GPRS support node (SPGW/GGSN) until the user's service balance is recharged or refilled with monthly or other time cycles by calling support services or accessing other application provided services. Until data services are recharged, however, the user or the user's mobile device may continue making attempts to access data (e.g., background mobile applications seeking updates, etc.), and the packet core network may keep denying data services. Such repeated attempts at network access and subsequent denials may result in a large statistical error count and unnecessary network congestion. One practical application of this disclosure may be to reduce attempts for the cellular network to reach up to the PCRF or OCS, thus reducing unnecessary congestion on the network and increasing network efficiency.

Figure 1:
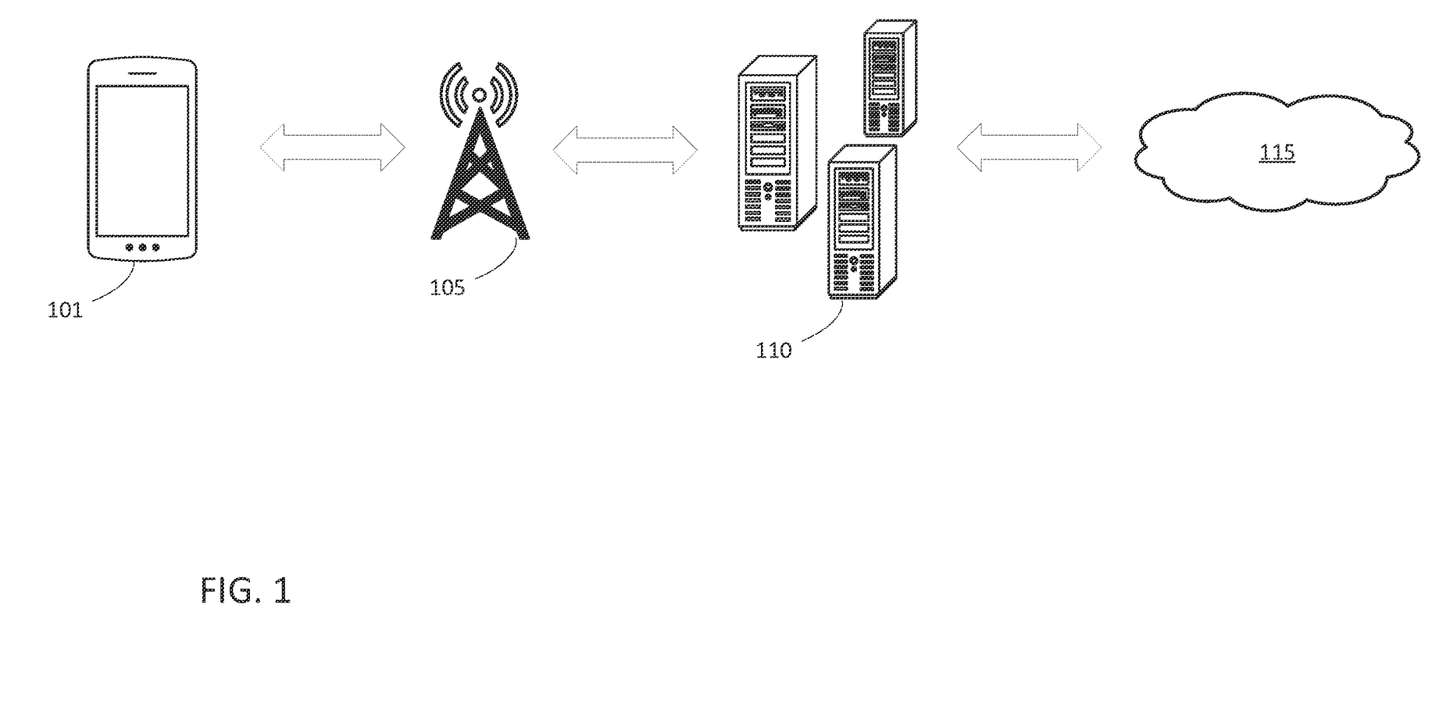
FIG. 1 is a high level diagram of an embodiment of a system for reducing wireless network congestion in accordance with the disclosure.

FIG. 1 shows a high level diagram of a portion of a system for reducing wireless congestion as described herein for a Long Term Evolution (LTE) network or other cellular data network (e.g., 2G, 3G, 4G, 5G, GSM, etc.). One of the fundamental concepts to network architecture may be that mobile devices 101 (e.g., UE for LTE networks) may connect to base stations that make up a radio access network (RAN) 105 via radio signals. The RAN 105 may be one of a variety of network types known to those skilled in the art, such as the Evolved Universal Terrestrial Radio Access Network (E-UTRAN), Universal Mobile Telecommunications System (UMTS), High Speed Packet Access/High Speed Uplink Packet Access (HSPA/HSDPA). In some embodiments, the base stations may include E-UTRAN Node B) ("eNB" or "eNodeB) (e.g., for LTE networks), base transceiver station (BTS) (e.g., for GSM networks), Node B (e.g., for UTRA of UMTS), Home eNodeBs (HeNB), Donor eNodeBs (DeNB), and Relay Nodes (RN), but those skilled in the art will recognize that the RAN may be made up of other suitable types of base stations. In some embodiments, a core network 110, such as the Evolved Packet Core (EPC)

or the General Packet Radio Service (GPRS) may then transmit and receive internet protocol (IP) packets to and from an external network 115, such as the Internet. The core network 110 may act as the routing and computing brain of the network. The external network 115 may have a large number of entry and exit points, including the internet and connections to other cellular networks. FIG. 1 illustrates these high-level concepts.

Figure 2:
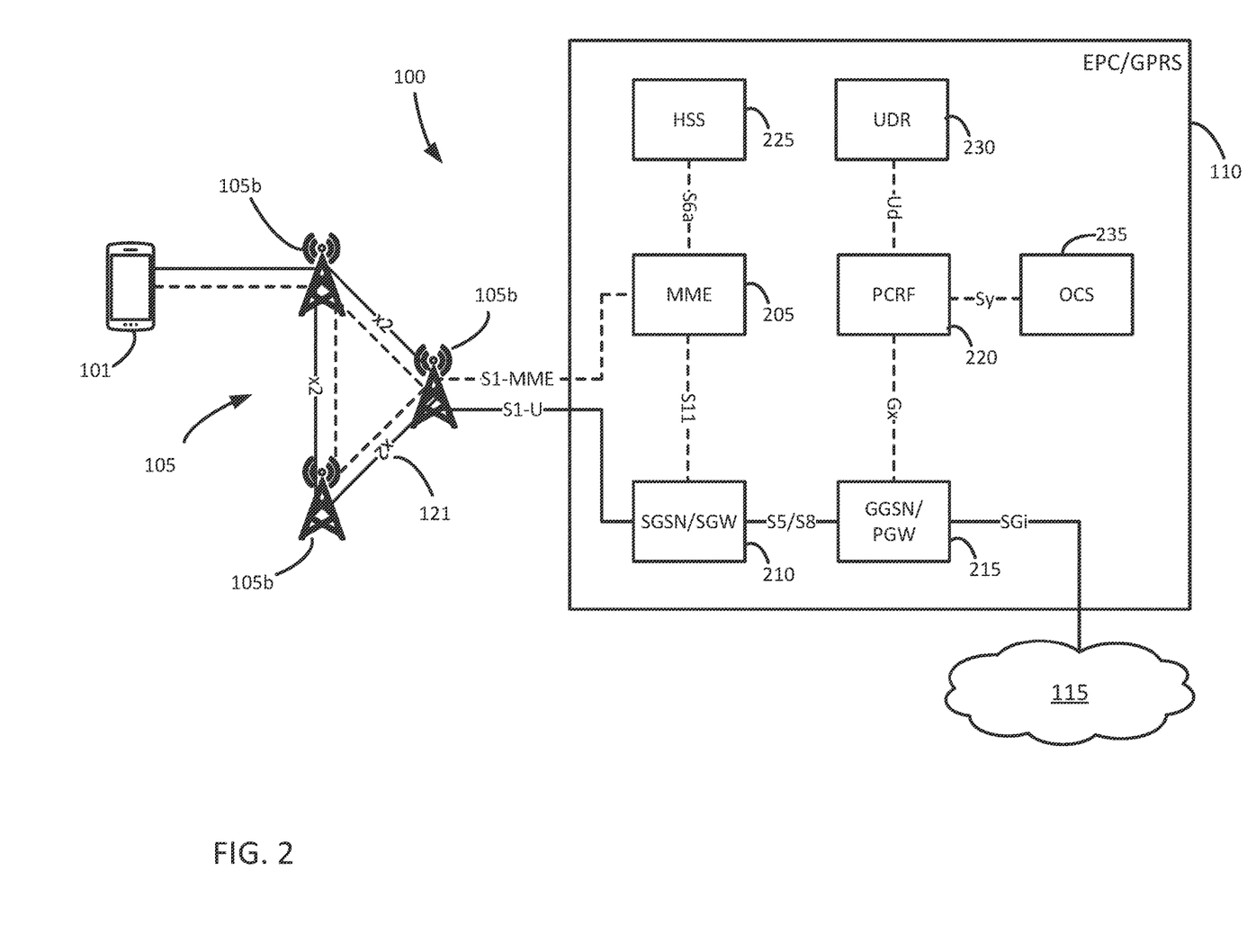
FIG. 2 is a diagram of components of an embodiment of the system for reducing wireless network congestion of FIG. 1.

Mobile devices 101 may connect to the RAN 105 to send data to the external network 115. The RAN 105 may include a mesh network composed of base stations 105b, such as shown in FIG. 2. Each base station 105b may modulate and demodulate radio signals to communicate with mobile devices 101. Base stations 105b may then act as a relay point to create and send IP packets to and from the core network. Cellular networks may be designed to pass connectivity from one radio access device in the RAN 105 to the next as the connected mobile device 101 changes location. This seamless handoff ability may allow devices to have a constant connection with minimal interruptions providing what is known as 'mobility' within cellular networks. Base stations 105b, particularly in LTE networks including eNodeB, may use the X2 interface 121 to communicate with each other, primarily transmitting control signaling to allow for LTE network communication enabling mobile device 101 mobility. During this handover, the serving base station 105b may transfer all mobile device 101 context1, cellular parameters and other information about the mobile device 101, to the receiving base station 105b.

Referring to FIG. 2, the core network 110 may include an EPC (e.g., for LTE networks). The EPC may include a mobility management entity (MME) 205, serving gateways (SGW) 210, packet data network gateways (PGW) 215, a home subscriber server (HSS) 225, a policy and charging rules function (PCRF) 220. The MME 205 may be a primary network signaling node that may not interact with user traffic. The MME 205 may include a large variation in functionality including managing/storing mobile device 101 contexts, creating temporary IDs, sending pages, controlling authentication functions, and selecting the SGW 210 and PGWs 215. Mobile devices 101 may receive control signals through base stations 105b originating from the MME 205. Each SGW 210 may carry user data, anchor mobile devices 101 for intra-base station (e.g., eNodeB) 105b handoffs, and route information between the PGW 215 and the RAN 105. Each SGW 210 may interface with the MME via a S11 interface protocol. Each PGW 215 may provide connectivity from the mobile device 101 to external networks by being the point of exit and entry of traffic. A mobile device 101 may have simultaneous connectivity with more than one PGW 215 for accessing multiple packet data networks (PDNs). The PGW may perform policy enforcement, packet filtering for each user, charging support, lawful interception and packet screening. The PGW may also act as the anchor for mobility between 3rd generation partnership project (3GPP) and non-3GPP technologies such as WiMAX and 3GPP2 (CDMA 1x and EvDO). The PGW may interface with one or more SGWs via the S5/S8 protocol, for example. The HSS 225 may include a central database that contains user-related and subscription-related information. In some embodiments, the functions of the HSS 225 may include mobility management, call and session establishment support, user authentication, and access authorization. The HSS 225 may interface with the MME using the S6a protocol.

The PCRF 220 may include rules and policies related to quality of service (QoS), charging, and access to network resources are distributed to the PGW 215 and enforced by the PCRF 220. The PCRF may interface with the PGW 215 using the Gx protocol. In some embodiments, the PCRF 220 may be a software node designated in real-time to determine policy rules in the network. The PCRF 220 may be a software component that may operate at the core network 110 and may access subscriber databases and other specialized functions, such as a charging system, in a centralized manner. The PCRF 220 may be the part of the network architecture that aggregates information to and from the network, operational support systems, and other sources (such as portals) in substantially real time, supporting the creation of rules and then automatically making policy decisions for each subscriber active on the network. In some embodiments, a network might offer multiple services, quality of service (QoS) levels, and charging rules. The PCRF 220 may also be integrated with different platforms like billing, rating, charging, and subscriber database or can also be deployed as a standalone entity.

FIG. 2 depicts some of the components introduced above and shows the data flows between these network components. This graphic may serve as reference to visualize the interconnected fundamental LTE network components and may depict concepts not yet discussed. The solid lines in the diagram depict user traffic, while the dashed lines depict control signaling traffic.

In embodiments that include a GSM network, a GPRS instead of or in addition to an EPC. The GPRS may support of packet switching traffic in a GSM network. The GPRS may include a gateway GPRS support node (GGSN) instead of a PGW and a serving GPRS support node (SGSN) 210 instead of an SGW. The GGSN 215 may be responsible for the interworking between the GPRS network and external packet switched networks, like the Internet and X.25 networks. When the GGSN 215 receives data addressed to a specific user, it may check if the user is active. If it is, the GGSN 215 may forward the data to the SGSN 210 serving the mobile device 101 for that user, but if the mobile user is inactive, the data may be discarded. Mobile-originated packets may be routed to the correct network by the GGSN 215. To do all this, the GGSN 215 may keep a record of active mobile users and the SGSN 210 the mobile users are attached to. It may allocate IP addresses to mobile devices 101 of mobiles users and be responsible for billing. The SGSN 210 may handle all packet switched data within the network, e.g., the mobility management and authentication of the users. The SGSN 210 may be the service access point to the GPRS network for the mobile user. The SGSN 210 may relay data between the SGSN and relevant GGSN 215 (and vice versa). The SGSN 210 may handle the protocol conversion from the IP used in the backbone network to the sub-network-dependent convergence protocol (SNDCP) and logical link control (LLC) protocols used between the SGSN and the mobile users. These protocols may handle compression and ciphering. The SGSN 210 may also be responsible for the authentication of GPRS mobiles. When the authentication is successful, the SGSN 210 handles the registration of the mobile to the GPRS network and takes care of its mobility management.

In some embodiments, the core network 110 may also include a user data repository (UDR) 230 and an online charging system (OCS) 235. The OCS 235 may be system that may allow a communications service provider to charge its customers, in substantially real time, based on service usage. In some embodiments, the OCS may interface with the PCRF via the Sy protocol. The UDR 230 may be a functional entity that may act as a single logical repository of user data. Entities that do not store user data and that need to access user data stored in the UDR 230 are collectively known as application front ends. Application Front Ends may connect to the UDR 230 through the reference point named Ud to access user data.

In some embodiments, when a user's data balance may be exhausted, the international mobile subscriber identity (IMSI)/mobile station integrated services digital network (MSISDN)/access point name (APN) (collectively, IMSI/MSISDN/APN) services may be blocked by the packet core network. Often, the blocking may be achieved by a Gx diameter session between the GGSN/PGW 215 and the PCRF 220 that may be associated with an Sy session with the OCS. When a user data balance reaches zero, additional data service may be denied, the PCRF 220 may send a blocking charging rule base name (CRBN)/charging rule name (CRN)/Diameter 5xx3 error code or zero Quality of Service (QoS). In such instances, the SPGW/GGSN, PGW 215 and/or SGW 210 may respond to the RAN 105 with a specific error reason, which may be passed on to the mobile device 101.

Each geographic region where a mobile device may be located may have customer support within a specific time period, such as 7 AM to 11 PM, 8 AM to 10 PM, etc. At times outside of the support time period, customer support may not be available. For example, if the customer support time period is 8 AM to 10 PM, then a user may not be able to replenish exhausted data access between 10 PM and 8 AM. Accordingly, any continuing attempts by the user to access data with the user's mobile device may be blocked. During this time, the mobile device may keep transmitting data access requests and the network may keep denying them. This may result in a large statistical error count plus a call flow paging from RAN=>GGSN=>PCRF=>OCS=><=back loop.

To help avoid such scenarios, the disclosure describes that when user services may be blocked, for example, using a Gx session (e.g., between PGW 215 and PCRF 220) with one of a variety of methods such as CRBN or CRN or diameter error code (5xx3) or zero QoS, the GGSN/PGW may create entries (e.g., using regular expressions) to keep track of the combination of MSISDN/APN/Location/block reason. For example, a given user may have limited data services for 10 GB for a given period, after which data services should be denied. For any subsequent attempts to access data through the network, the PCRF 220 may send message to block all data service to the SPGW/GGSN (or PGW 215 and SGW 210) and the mobile device will not be able to access data. While the SPGW/GGSN is blocking data services, it may create regular expressions for matching conditions, such as:

Time frame match=10 PM to 8 AM (outside support time period)
MSISDN=xxxxxxxxxx
APN=xxxxxxxxxx.xxx.xxx Each new request for data connection from a mobile device 101 associated with a user may include "access point name" (APN) and "network access location information" with access area "date and time." If each of the conditions listed above are matched, the SPGW/GGSN may deny service without interfacing with the PCRF or OCS, thus reducing network congestion. More detailed descriptions of the steps in such a system are described below with reference to the first and second logic flows 350, 360 of FIG. 3.

Figure 3:
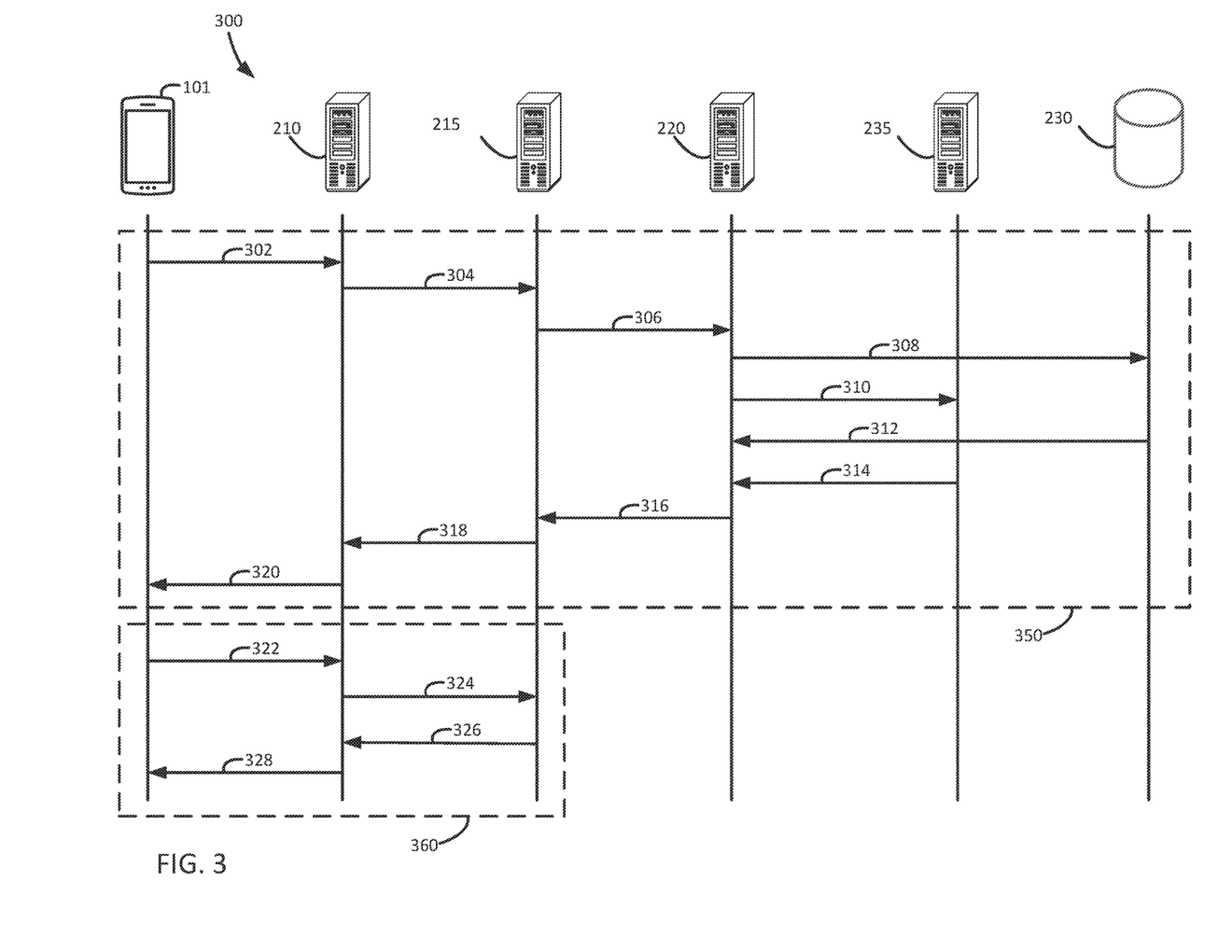
FIG. 3 is a flow diagram of an embodiment of a method of reducing wireless network congestion using the system of FIG. 1.

FIG. 3 is a flow diagram 300 of the steps in an embodiment for using the system for reducing network congestion. As described above, the system and methods may apply to scenarios in which a mobile device may be attempting to access data via the network, but the associated user has no more data available to use due to account restrictions or other scenarios. In one example, a user may have international roaming status and have previously paid for or enrolled in a program for a limited amount of data while traveling abroad (e.g., 10 GB). Once the allotted for data has been exhausted, the mobile device 101 associated with the user's account may no longer be able to access data via the network. The system 100 described herein may provide for more efficiently determining that the particular mobile device 101 should not have access to additional data through the network while reducing computing and network resources used.

The diagram 300 includes illustrations of transmissions between various components of the system 100 shown in FIG. 2, such as the mobile device 101, one or more SGSN/SGW 210 (a first network node), one or more GGSN/PGW 215 (a second network node), the PCRF 220 (a third network node), the OCS 235 (a fourth network node), and the UDR 230. The overall diagram 300 incudes a first logic flow 350 and a second logic flow 360 that may be triggered to occur after the first logic flow has occurred. The first logic flow 350 may result in an initial denial of the data request, and the second logic flow 360 may be a streamlined and less resource intensive denial of subsequent data requests based on the initial denial in the first logic flow.

The first logic flow 350 may include the mobile device, at 302, attempting to access data via the network. The data access attempts may be directly from a user, from an application running on the mobile device, etc. The mobile device 101 may interface with a particular SGSN/SGW 210 via the RAN 105 via, for example, the S1-U interface. At 304, the SGSN/SGW 210 may, via the S5/S8 interface, create and send a session request or create a packet data protocol (PDP) context. The PDP context may be a connection between a between a base station 105b and an end address that may go through the SGSN/SGW 210 and the GGSN/PGW 215. In some embodiments, the information included in the PDP context or session request may include the mobile device's 101 international mobile subscriber identity (IMSI) unique to the mobile user or subscriber, the mobile station integrated services digital network (MSISDN) number for the mobile device, the access point name (APN) for the mobile device, the location information for the mobile device, and the time zone in which the mobile device is located (shorthand IMSI/MSISDN/APN/LOC info/Time-zone). At 306, the GGSN/PGW 215 may, upon receiving the request from the SGSN/SGW 210, transmit a Diameter credit control request to the PCRF 220 via the Gx interface. The credit control request (CCR) may be sent to request rules for the user associated with the mobile device 101. The Gx interface may be used to handle policy and charging (PCC) rules. In some embodiments, the PCC rules may contain charging related information as well as quality of service (QoS) parameters that may be used in bearer establishment (i.e., tunnels used to connect the mobile device to the packet data networks (PDNs)). Diameter protocol may be used in the Gx interface.

At 308, the PCRF 220 may transmit a lightweight directory access protocol (LDAP) query to the UDR 230 via a Ud interface to access user profile data. The LDAP may be an application protocol for accessing and maintaining distributed directory information services over the IP network. The directory services may allow the sharing of information about users, systems, networks, services, and applications throughout the network. At 310, the PCRF 220 may transmit Sy diameter counter status to the OCS 235 via an Sy interface. The Sy reference point may be located between the PCRF 220 and the OCS 235, and may enable transfer of information relating to subscriber spending from OCS to PCRF. The Sy reference point may supports functions such as requests of policy counter status reporting from PCRF to OCS, notification of policy counter status change from OCS to PCRF, cancellation of policy counter status reporting from PCRF to OCS, etc. Accordingly, the request for policy counter status reporting may provide information for the PCRF to determine whether the user has data remaining to use or has reached or exceeded a data limit. At 312, the UDR 230 may provide an LDAP response to the LDAP request. The LDAP response may include user profile information for the user associated with the mobile device 101. In response to the Sy diameter counter status request, at 314, the OCS 235 may transmit an Sy response counter depleted message to the PCRF 220. The Sy response may indicate that the user has met or exceeded that data allocation for the user account.

Based on this indication, the PCRF 220, at 316, may transmit an authorization rejected message to the GGSN/PGW 215 denying access to data on the network. In some embodiments, the message rejecting authorization may be a charging rule base name (CRBN) such as a data blocking CBRN to block all traffic, a charging rule name (CRN) that blocks data traffic, a Diameter Error code (5xx3), or zero QoS from the PCRF 220. Those skilled in the art will understand that other suitable error codes indicating data blocking may also be used. In some embodiments, the GGSN/PGW 215 may, based on the authorization rejected message, create its own entry table for the MSISDN, associated APN for the mobile device, location data, and may also cache the response sent over the GPRS tunneling protocol (GTP). For example, if a the GGSN/PGW 215 receives a Diameter error code 5003 blocking all data, the GGSN/PGW may include that result in the cached table along with the associated MSISDN, APN, and location information for the mobile device 101 and associated user account. As described below, the GGSN/PGW 215 may reference the cached table in response to subsequent data access attempts by the mobile device. At 318, in response to the authorization reject message, the GGSN/PGW 215 may transmit an authentication failed, delete PDP, or delete session request to the SGSN/SGW 210, indicating that no data may be transmitted to the mobile device 101. At 320, the request by the mobile device 101 to access data may fail, resulting in a default message from an internet browser or other application that has attempted to access data via the network.

Once the first logic flow 350 has completed, the GGSN/PGW 215 may create and store an entry table the contents of which may be referenced upon receiving new requests. The second logic flow 360 may include subsequent requests by the same mobile device 101 to access data via the network. At 322, the mobile device 101 may make a subsequent data request by interfacing with a particular SGSN/SGW 210 via the RAN 105 via, for example, the S1-U interface. In response, at 324, the SGSN/SGW 210 may, via the S5/S8 interface, create and send a subsequent session request or create a subsequent PDP context that may include IMSI/MSISDN/APN/LOC info/Time-zone for the mobile device. The GGSN/PGW 215 may scan or analyze the PDP context information from the subsequent PDP context to determine whether it matches the PDP context information from the initial session request or PDP context. If the GGSN/PGW 215 determines that the conditions or information of the subsequent request match the conditions or information stored from the initial request, the SGSN/SGW 210 and/or GGSN/PGW 215, at 326, may provide the same response denying data access as in the initial request without sending the request on to the PCRF 220 at least during a predetermined time period. The SGSN/SGW 210 may deny data access to the mobile device 101 at 328. Thus, the GGSN/PGW 215 may more efficiently provide an appropriate denial of data access to a mobile device 101 using the second logic flow 360 by reducing load or demand on the PCRF 220, OCS 235, UDR 230, and the network interfaces connecting those other associated resources.

Tables 1 and 2 are examples of the table entries and logic that may be used by the GGSN/PGW 215 in the first logic flow 350 and the second logic flow 360. During the first logic flow 350, the GGSN/PGW 215 may create an entry table such as Table 1:

TABLE 1

| FOR | | | | | |
|---|---|---|---|---|---|
| Location | Location list | Roaming | | | |
| | 1 | 310410 | | | |
| | 2 | 911211 | | | |
| | 3 | 23456 | | | |
| | 4 | 21345 | | | |
| IF | Response | CRBN, Error code 5xxx | Block all data | 5003 | |
| Action: Start caching | MSISDN | APN | RAT TYPE | LOCATION | RESPONSE |
| | =1234567891 | =carrier data | EUTRAN | 310410 | 5003 |

As in the example shown in Table 1, the GGSN/PGW 215 may create an entry table with parameters populated based on the mobile device 101 and the user account associated with the mobile device. For the embodiment represented in Table 1, the system may be configured to only identify mobile devices that are in roaming status. In Table 1, the GGSN/PGW 215 created a table that includes a Location List and Roaming codes that may trigger the GGSN/PGW 215 to start caching the MSISDN, APN, radio access technology (RAT), location, and response from the PCRF 330. In Table 1, the response is "5003," representing a Diameter error code for an authorization rejected message. As shown in Table 2, any new requests to the GGSN/PGW 215 may be scanned to determine whether the information in the request matches the information in Table 1 (or any other cached entry tables):

TABLE 2

| Any NEW REQUEST IN | Scan for cached data | |
|---|---|---|
| Condition check | MSISDN | =1234567891 |
| | APN | =carrier data |

TABLE 2-continued

| Any NEW REQUEST IN | Scan for cached data | |
|---|---|---|
| | RAT Type | =EUTRAN |
| | Location list | |
| | 1 | 310410 |
| | 2 | 911211 |
| | 3 | 23456 |
| | 4 | 21345 |
| | Local time frame | match = >6 PM to <8 AM |
| | Action | send old cached response = 5003 |

During the second logic flow 360, the GGSN/PGW 215 may determine that each of the MSISDN, APN, RAT Type, and location matches one of the cache entry tables determined in the first logic flow 350. In some embodiments, the GGSN/PGW 215 may also determine if the local time for the mobile device 101 matches a predetermined time frame during which the second logic flow should be applied. For example, in some embodiments, if a user has exceeded an allotted amount of data usage, a user may only be able to access customer service to purchase more data access during certain hours, e.g., 8 AM to 6 PM. Accordingly, if the first logic flow 350 occurs between 6 PM and 8 AM, and the second logic flow 360 takes place within the same time period, the user will have had no opportunity to purchase additional data access. In such embodiments, the GGSN/PGW 215 may return the exact same response (e.g., error code, data block, etc.). In some embodiments, the GGSN/PGW 215 may purge all cached entry tables created during the first logic flow 350 at a predetermined time, such as 8 AM. As a result, the system may not implement the second logic flow 360 if the user has had an opportunity to purchase or otherwise replenish data access.

Figure 4A:
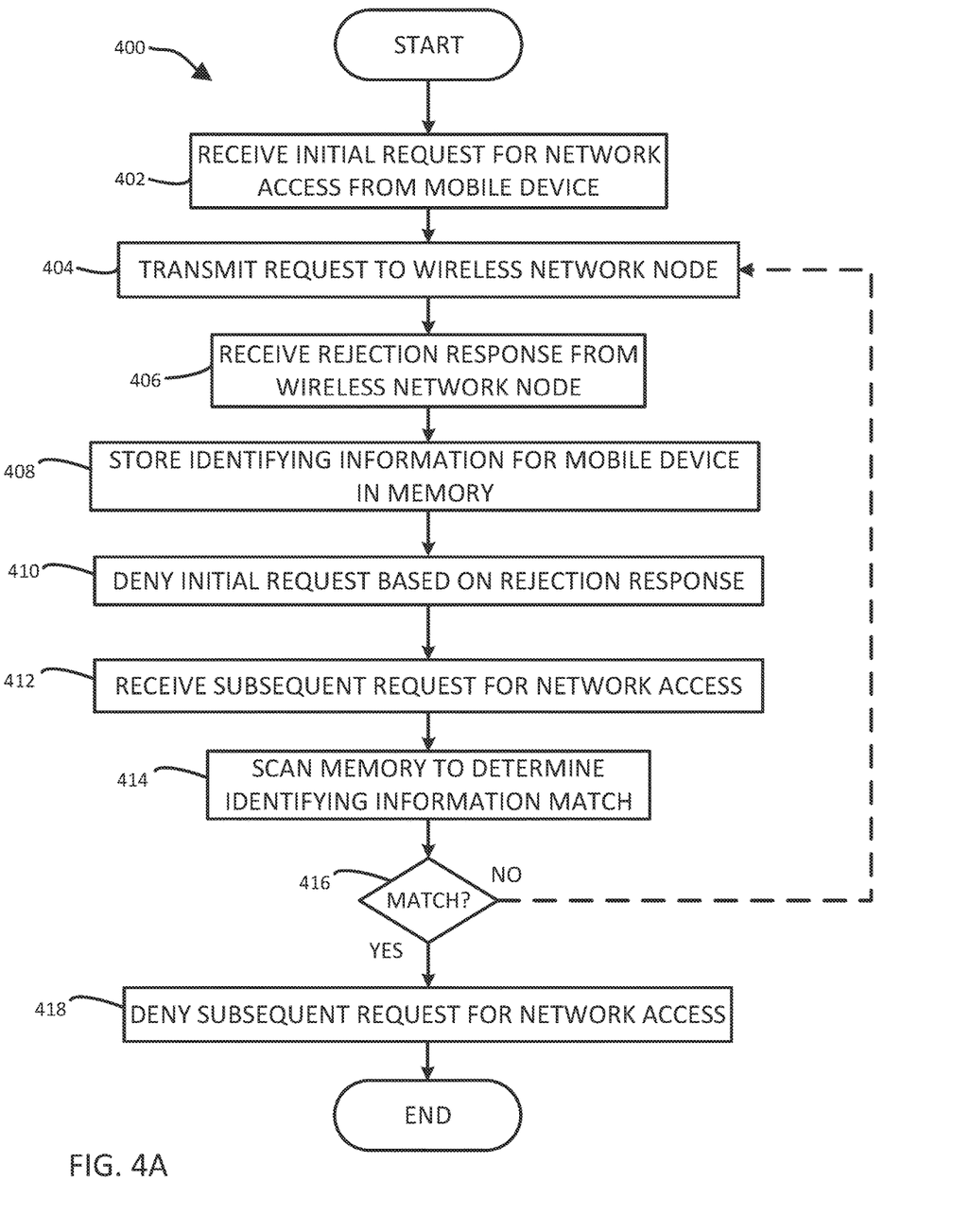
FIG. 4A is a flowchart of an embodiment of a method of reducing wireless network congestion using the system of FIG. 1.

FIG. 4A illustrates an embodiment of a method 400 of using the system for reducing wireless network congestion described herein. At 402, the method may include receiving an initial request for network access from a mobile device, such as the mobile device 101 from the system 100 of FIG. 2. In some embodiments, the GGSN/PGW 215 may receive the request. At 404, the method may include transmitting a request to a wireless network node, such as transmitting a CCR to a PCRF 220. At 406, the method may include receiving a rejection response from the wireless network node. At 408, the method may include storing the identifying information for the mobile device in memory and, at 410, denying the initial request based on the received rejection response. In some embodiments, steps 402 through 410 may be part of a first logic flow, such as the first logic flow 350 in FIG. 3. At 412, the method may include receiving a subsequent request for network access and, at 414, scanning the memory to determine whether the stored identifying information from the mobile device associated with the initial request for network access matches identifying information for a mobile device associated with the subsequent request. At 416, if the identifying information of the subsequent request does not match identifying information stored in the memory, the method may include proceeding to transmit the subsequent request to a wireless network node at 404. If the identifying information of the subsequent request matches identifying information stored in the memory, at 418, the method may include denying the subsequent request for network access. In some embodiments, steps 412 through 418 may be part of a second logic flow, such as second logic flow 360 in FIG. 3. Those skilled in the art will understand that the steps in the method 400 may overlap with the system 100 of FIG. 2 and the flow diagram 300 of FIG. 3

Figure 4B:
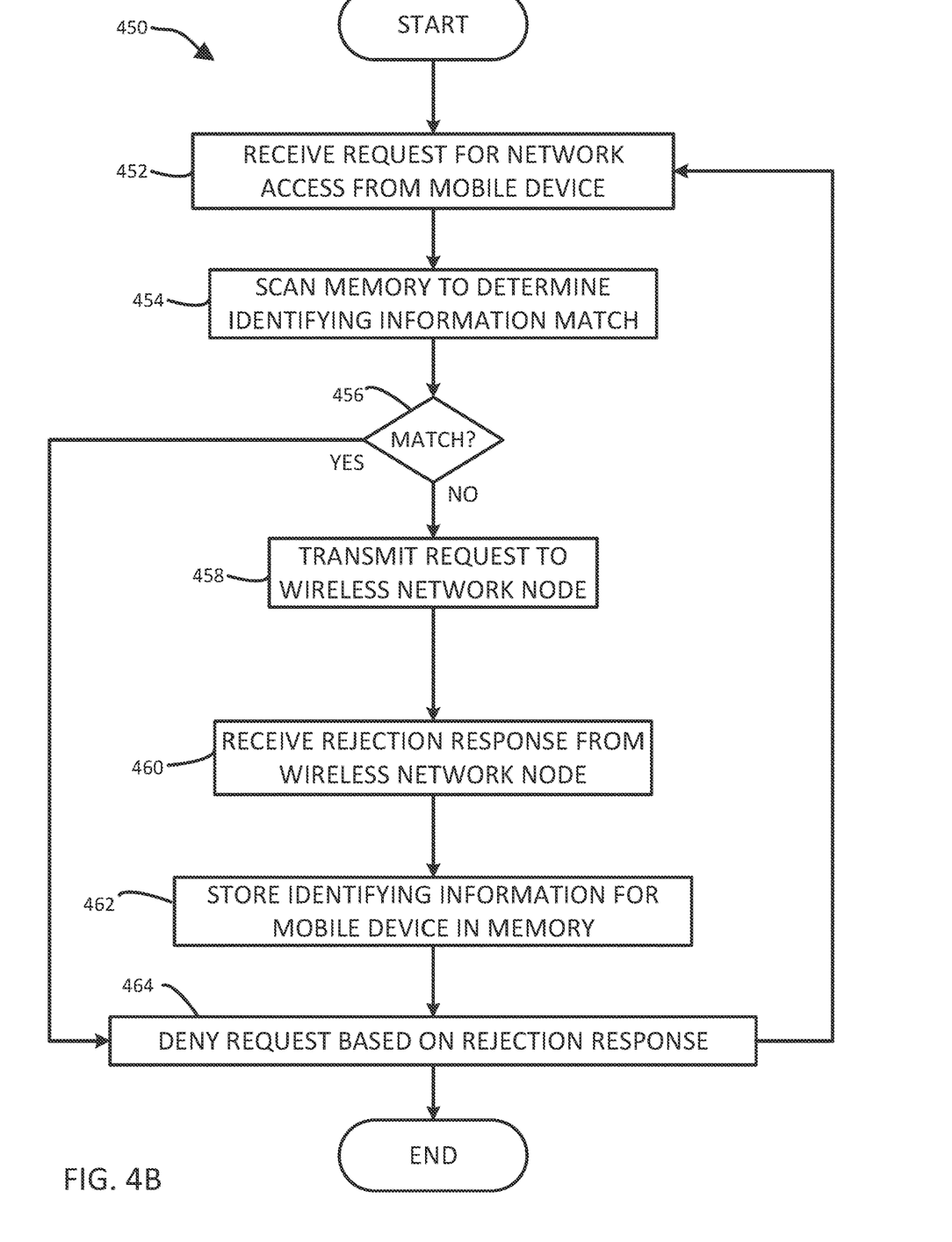
FIG. 4B is a flowchart of another embodiment of a method of reducing wireless network congestion using the system of FIG. 1.

FIG. 4B illustrates another embodiment of a method 450 of using the system for reducing wireless network congestion described herein. At 452, the method may include receiving a request for network access from a mobile device, such as the mobile device 101 from the system 100 of FIG. 2. At 454, the method may include scanning a memory to determine if identifying information associated with the mobile device matches identifying information related to previous requests for network access stored in the memory. If no match if found at 456, the method may include, at 458, transmitting a request to a wireless network node, such as transmitting a CCR to a PCRF 220. At 460, the method may include receiving a rejection response from the wireless network node. At 462, the method may include storing the identifying information for the mobile device in memory and, at 464, denying the initial request based on the received rejection response. If, however, at 456, identifying information associated with the mobile device matches identifying information related to previous requests for network access stored in the memory, the method may include, at 464, denying the request for network access based on a determination that the mobile device associated with the matched identifying information had been previously denied access to the network. In some embodiments.

Figure 5:
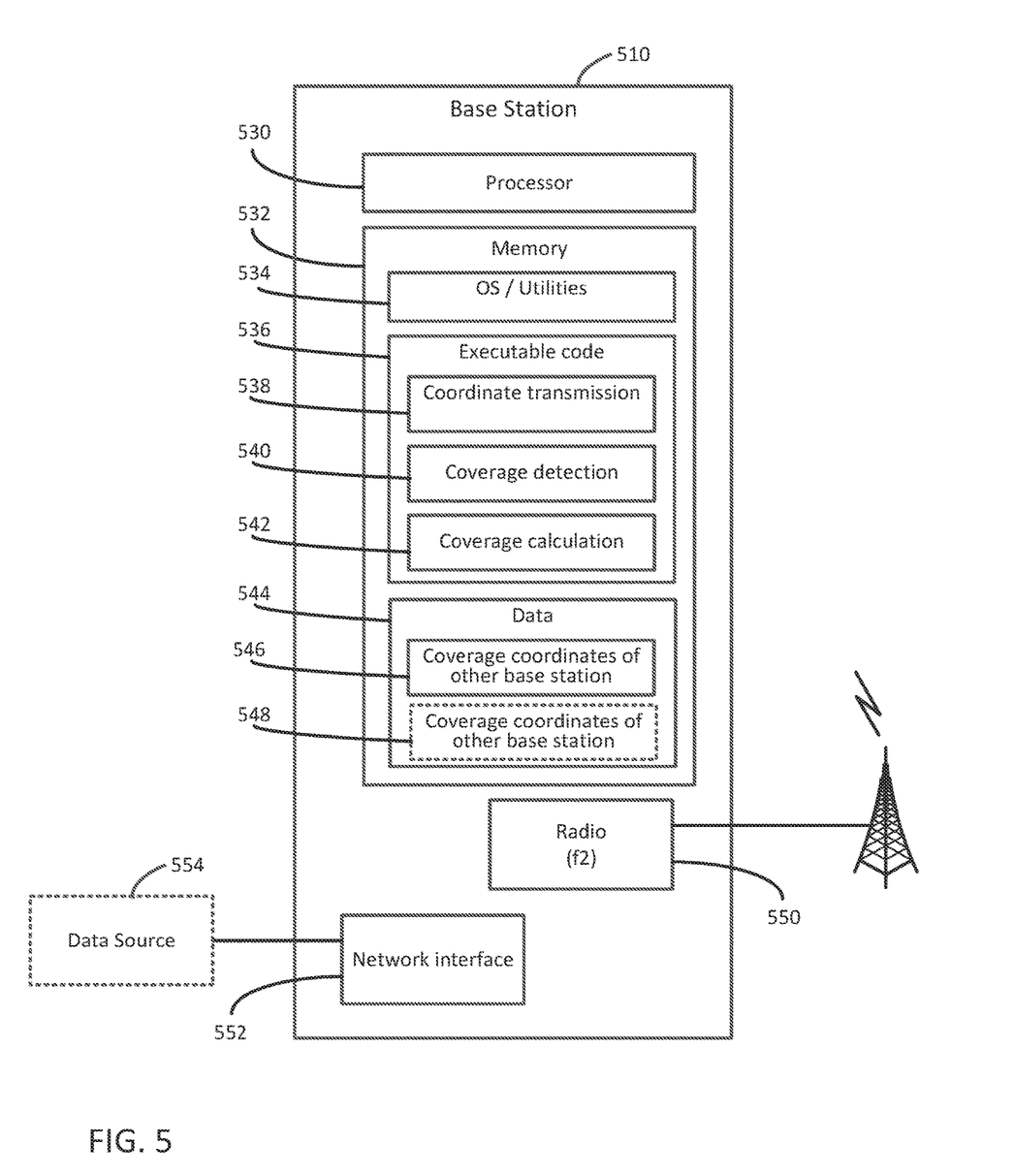
FIG. 5 is a block diagram of an exemplary base station configured for operation in the system of FIG. 1.

FIG. 5 illustrates a block diagram of an exemplary base station 510 in accordance with the current disclosure. In some embodiments, base station 510 may be representative of base stations 105a in system 100, but it will be understood by those skilled in the art that other base station configurations may be used consistent with the disclosure. The base station 510 may include a processor 530 that is in communication with a memory 532. The memory 532 may include an operating system and utilities 534 used to manage operations of the base station including booting, memory management, communications, error handling, software updates, etc. The memory 532 may also store executable instructions 536 and data 544.

The base station 510 may have a radio 550 operating at a frequency band that provides for a coverage for a particular area. In some embodiments, the base station 510 may operate in a frequency band in the 700 MHz frequency range with a coverage radius of as much as 7 kilometers. In some systems, wide area coverage may be provided by an overlapping network of similar band radios, operating at up to 2.5 GHz, but having similar coverage areas. 4G LTE network is such an example. In such systems, an electronic device may tell one base station when it is getting a stronger signal from another base station so that a handoff between base stations can be executed. In some embodiments, handoff PM data may be passed between neighboring base stations to accommodate such handoffs.

In some 5G (fifth generation cellular) standard, a mixed system of low band (e.g., 700 MHz base stations) may be intermixed with millimeter wave radios operating in frequency bands around 50 GHz. These so called NR (new radio) radios may have a coverage radius of 500 meters or less depending on terrain and other obstructions. The 5G implementation may mix these bands with significantly different coverage areas.

The base station 510 may also include a network interface 552 used for routing traffic from land-based switch gear (not depicted). The network interface 552 may also communicate with an external data source 554 in some embodiments.

The executable instructions 536 may include various modules or routines that are used for location-matrix based band scanning. For example, in an embodiment, the memory 532 may include a coordinate transmission module 538, a coverage detection module 540, and a coverage calculation module 542. The data 544 may include coverage coordinates 546, or descriptors, of the coverage area of other base stations. The data 544 may also include coverage coordinates 548 for other base stations (not depicted) having small coverage areas compared to that of the base station 510.

The coordinate transmission module 538 may be responsible for determining when an electronic device is in the coverage area of the base station 510 and to transmit coordinates of one or more smaller coverage areas to the electronic device. In some embodiments, the coverage area may only be partially within its own coverage area, if at all. The coordinate transfer may be over the broadcast channel as data or may be transmitted over a control channel, as bandwidth permits.

Another code module may be the coverage detection module 540. Coverage detection may involve receiving location information from the electronic device as the electronic device is handed off either to or from a neighbor base station. This location information may be combined with location information from other devices at the coverage calculation module 542 to form a locus of points defining the coverage boundary. The coordinate data 546 may then be updated accordingly. The updated location information may be valuable especially in the case of millimeter wave systems, where some atmospheric conditions, temporary construction, etc. may affect broadcast range. In another embodiment, coverage coordinates 546 may be received at the base station 510 from an external data source 554. The base station 510 may provide the location information from the electronic device regarding coverage boundaries to the external data source 554 for use in refine the descriptors for the coverage area. In other embodiments, the coverage coordinates 546 may be determined by survey at the time of installation of the base station 510 or may be independently updated separate from any live use by the electronic device.

At least one technical effect of the system and methods described above is an increased network efficiency as unnecessary data access requests that would otherwise tax the network may be reduced. This technical effect solves at least the technical problem of denying data access using minimal network resources for repeated access attempts during time periods in which no data recharging would be possible. Reducing network congestion may increase the efficiency and speed of the network overall, allowing increased data speeds for other users with data available for use. Improved efficiency of network resources may also lead to more efficient troubleshooting due to reduced statistical error logs at gateways, nodes, etc.

Additional advantages to the system and methods described herein include restricting unwanted session requests to the PCRF and the OCS, which may reduce network congestion. Additionally, network monitor statistics at billing and the PCRF may be less paged for such denial instances and provide a cleaner and more efficient report. In other words, more streamlined reports of service denials may be available as a result of not including many subsequent attempts by the same mobile device. Further, if a user has a zero data balance and any blocking condition is applied, the mobile device may also not be able to access data during an outage at the PCRF or the charging system, where otherwise such access may be allowed. The benefits of such a system may be even more evident for machine to machine data plans, or for 5G network data access with increased data speeds.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method for reducing wireless network congestion, the method comprising:
   receiving, at a network node, an initial request for network access from a mobile device from an initial location of the mobile device, the initial request including first information that includes a first access point name (APN), first network access location information, a first date, and a first time period;
   in response to receiving the initial request for network access, determining whether a data allocation for the mobile device has been exceeded;
   denying, by the network node, the initial request for network access when the data allocation for the mobile device has been exceeded;
   receiving, at the network node, a subsequent request for network access from the mobile device from a subsequent location of the mobile device, wherein the subsequent request includes second information that includes a second access point name (APN), second network access location information, a second date, and a second time period;
   determining a customer support time period based at least in part on the subsequent location; and
   denying, by the network node, the subsequent request for network access when the subsequent location is in a geographic region that is the same as the initial location and in response to the first information matching the second information, wherein the subsequent request is denied without interfacing with a policy and charging rules function (PCRF) or an online charging system (OCS) in response to the first information matching the second information.

2. The method of claim 1 further comprising creating an entry table to store information identifying the mobile device and a user associated with the mobile device.

3. The method of claim 1, wherein the initial and subsequent requests includes one or more of:
   an international mobile subscriber identity (IMSI);
   a mobile station integrated services digital network (MSISDN);
   an access point name (APN);
   location information of the mobile device; and
   a time zone of the mobile device.

4. The method of claim 1, wherein the initial and subsequent requests for network access are roaming requests.

5. The method of claim 1, wherein the initial and subsequent requests for network access include a packet data protocol (PDP) context.

6. The method of claim 1 further comprising, in response to receiving the initial request, transmitting a session request from the network node to an additional network node configured to determine whether the data allocation for the mobile device has been exceeded.

7. The method of claim 6, wherein request to the additional network node is a first request, and further comprising transmitting a second request to the additional network node when the request time of the subsequent request for network access is within the customer support time period for the initial location.

8. The method of claim 7, wherein the additional network node is a policy and charging rules function (PCRF).

9. The method of claim 1 wherein the geographic region includes a first geographic region and the customer support time period includes a first customer support time period, the method further comprising determining a second customer support time period based at least in part on a second geographic region.

10. The method of claim 9, wherein the first customer support time period and the second customer support time period are different based at least in part on the first geographic region being different than the second geographic region.

11. A computer-implemented method for reducing wireless network congestion, the method comprising:
receiving an initial request for access to a network from a mobile device, the initial request including first information that includes a first access point name (APN), first network access location information, a first date, and a first time period;
denying the initial request when a data allocation for the mobile device has been exceeded;
receiving a subsequent request for access to the network, wherein the subsequent request includes second information that includes a second access point name (APN), second network access location information, a second date, and a second time period;
determining that a mobile station integrated services digital network (MSISDN) included with the subsequent request matches an MSISDN associated with the initial request;
determining a customer support time period based at least in part on geographic region in which the mobile device is located; and
denying the subsequent request for access to the network if a subsequent location of the mobile device is in the geographic region that is the same as an initial location of the mobile device and in response to the first information matching the second information, wherein the subsequent request is denied without interfacing with a policy and charging rules function (PCRF) or an online charging system (OCS) in response to the first information matching the second information.

12. The method of claim 11, wherein the initial request and subsequent request are received by a policy and charging rules function (PCRF).

13. The method of claim 11 further comprising creating an entry table to store the MSISDN included in the initial request.

14. The method of claim 11, wherein the initial request to access the network further comprises one or more of:
an international mobile subscriber identity (IMSI); and
a time zone of the mobile device.

15. The method of claim 11, wherein the initial and subsequent requests for network access are roaming requests.

16. The method of claim 11, wherein the initial and subsequent requests for network access include a packet data protocol (PDP) context.

17. The method of claim 11 further comprising transmitting a request to a network node when the request time of the subsequent request for network access is within the customer support time period for the initial location.

18. The method of claim 11 further comprising, in response to receiving the initial request, transmitting a session request to a network node configured to determine whether the data allocation for the mobile device has been exceeded.

19. A system for reducing wireless network congestion, the system comprising:
a first network node configured to:
receive, from a mobile device, an initial request to access a network from an initial location of the mobile device, the initial request including first information that includes a first access point name (APN), first network access location information, a first date, and a first time period, and
in response to receiving the initial request, transmit a session request; and
a second network node configured to:
receive the session request from the first network node,
determining a customer support time period based at least in part on geographic region in which the mobile device is located; and
transmit a network access denied response to the first network node when a data allocation for the mobile device has been exceeded;
wherein, upon receiving a subsequent request to access the network from the mobile device that includes second information that includes a second access point name (APN), second network access location information, a second date, and a second time period, the second network node is configured to deny the mobile device access to the network if a subsequent location of the mobile device is in the geographic region that is the same as the initial location of the mobile device and in response to the first information matching the second information, wherein the subsequent request is denied without interfacing with a policy and charging rules function (PCRF) or an online charging system (OCS) in response to the first information matching the second information.

20. The system of claim 19, wherein the second network node is further configured to, upon receiving the subsequent request to access the network from the mobile device, determine that an MSISDN associated with the subsequent request matches a stored MSISDN associated with the initial request to access the network, wherein denying the mobile device access to data via the network is based on the determination that the MSISDN associated with the subsequent request matches the stored MSISDN.

* * * * *